United States Patent
Jang

(10) Patent No.: US 8,514,289 B2
(45) Date of Patent: Aug. 20, 2013

(54) METHOD AND APPARATUS FOR ESTIMATING POINT SPREAD FUNCTION

(75) Inventor: Soon-geun Jang, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 364 days.

(21) Appl. No.: 12/947,984

(22) Filed: Nov. 17, 2010

(65) Prior Publication Data

US 2011/0122266 A1    May 26, 2011

(30) Foreign Application Priority Data

Nov. 20, 2009  (KR) .................. 10-2009-0112785

(51) Int. Cl.
*H04N 5/228*   (2006.01)
*H04N 5/217*   (2011.01)
*G06K 9/40*    (2006.01)

(52) U.S. Cl.
USPC ............... 348/208.12; 348/208.4; 348/241; 382/255; 382/260

(58) Field of Classification Search
USPC ........... 348/222.1, 241, 208.99, 208.4, 208.6, 348/208.12; 382/201, 255, 260, 263
See application file for complete search history.

(56) References Cited

U.S. PATENT DOCUMENTS

| 8,390,704 B2 * | 3/2013 | Wang et al. ............ 348/248 |
| 2006/0017837 A1 * | 1/2006 | Sorek et al. ............ 348/362 |
| 2006/0125938 A1 * | 6/2006 | Ben-Ezra et al. ........ 348/241 |

OTHER PUBLICATIONS

Chen et al., "Robust dual motion deblurring," IEEE Conference on Computer Vision and Pattern Recognition, 2008, CVPR 2008, IEEE, pp. 1-8 (2008).
Fergus et al., "Removing camera shake from a single photograph," ACM Transactions on Graphics (TOG), vol. 25(3), ACM, pp. 1-8 (2006).
Yuan et al., "Image debiurring with blurred/noisy image pairs," ACM Transactions on Graphics (TOG), vol. 26(3), ACM, pp. 1-10 (2007).

* cited by examiner

*Primary Examiner* — Daniel M Pasiewicz
(74) *Attorney, Agent, or Firm* — Drinker Biddle & Reath LLP

(57) ABSTRACT

A method of estimating a point spread function (PSF) includes: estimating a global motion between a short-exposure image and a long-exposure image that are continuously captured using different exposure times, and compensating for the global motion; calculating a first resultant image by applying a band pass filter to the short-exposure image; calculating a second resultant image by applying the band pass filter to the long-exposure image; converting the first resultant image and the second resultant image into n-level images, where n is an odd natural number greater than or equal to 3, by deducing a first n-level resultant image and a second n-level resultant image from the first resultant image and the second resultant image, respectively; correlating the first n-level resultant image and the second n-level resultant image, and calculating a correlation map; and deducing the PSF from the correlation map.

23 Claims, 13 Drawing Sheets

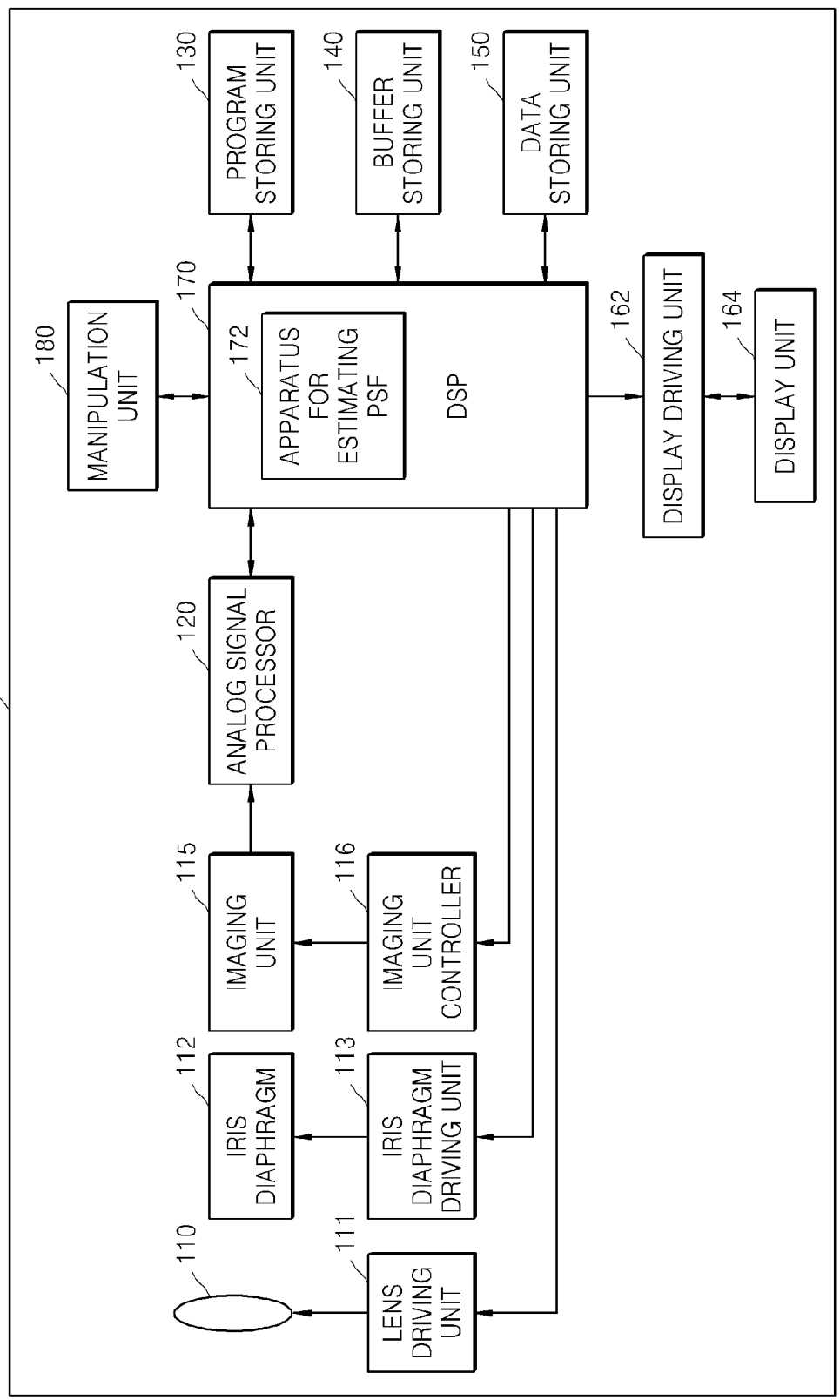

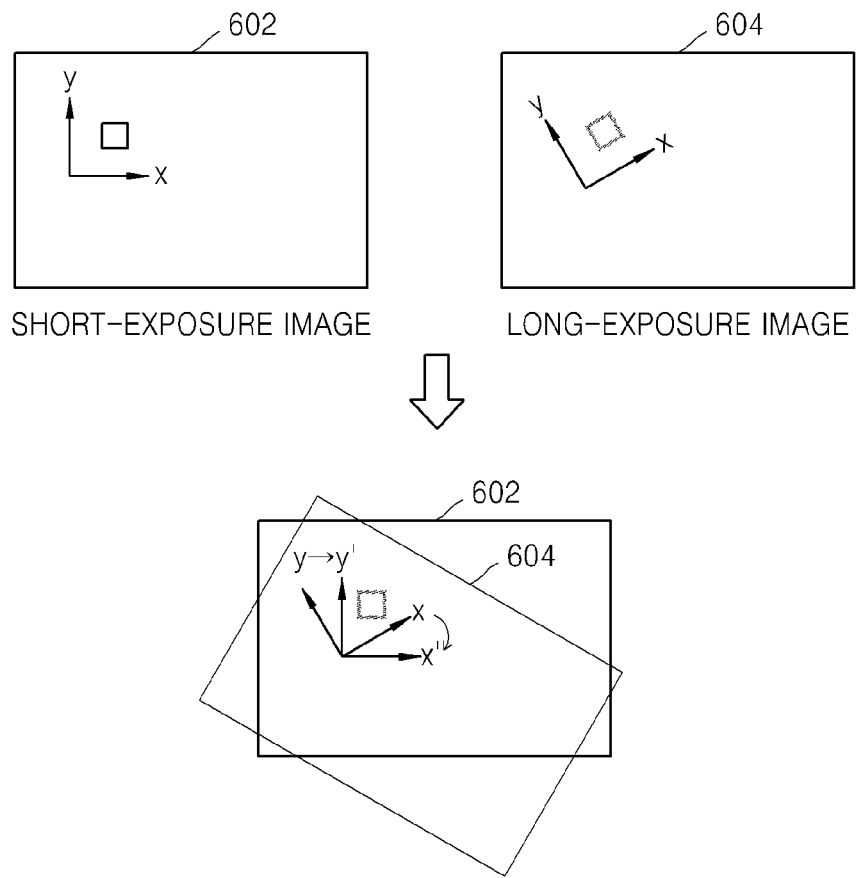

METHOD AND APPARATUS FOR ESTIMATING POINT SPREAD FUNCTION

CROSS-REFERENCE TO RELATED PATENT APPLICATION

This application claims the priority benefit of Korean Patent Application No. 10-2009-0112785, filed on Nov. 20, 2009, in the Korean Intellectual Property Office, the disclosure of which is incorporated herein in its entirety by reference.

BACKGROUND

1. Field of the Invention

Embodiments relate to a method and apparatus for estimating a point spread function (PSF), and a non-transitory computer readable storage medium having stored thereon a program executable by a processor for performing the method.

2. Description of the Related Art

Generally, digital photographing apparatuses convert an optical signal that is incident on an optical unit such as a lens or an iris diaphragm into an electrical signal by using an imaging unit, thereby photographing a subject. The imaging unit receives the optical signal from the subject while a shutter is opened, and is exposed according to the shutter. When digital photographing apparatuses are shaken due to trembling of the user's hand or the like while the shutter is opened, shake occurs in the captured image. Digital photographing apparatuses provide a function of correcting shake that occurs due to trembling of the user's hand. The function of correcting shake may be performed using a point spread function (PSF) that represents a shake path.

SUMMARY

Embodiments include a method and apparatus for estimating a point spread function (PSF) for correcting shake of an image captured by a digital photographing apparatus, and a non-transitory computer readable storage medium having stored thereon a program executable by a processor for performing the method.

According to an embodiment, a method of estimating a point spread function (PSF) includes: estimating a global motion between a short-exposure image and a long-exposure image that are continuously captured using different exposure times, and compensating for the global motion; calculating a first resultant image by applying a band pass filter to the short-exposure image; calculating a second resultant image by applying the band pass filter to the long-exposure image; converting the first resultant image and the second resultant image into n-level images, where n is an odd natural number greater than or equal to 3, by deducing a first n-level resultant image and a second n-level resultant image from the first resultant image and the second resultant image, respectively; correlating the first n-level resultant image and the second n-level resultant image, and calculating a correlation map; and deducing the PSF from the correlation map.

The band pass filter may be a difference-of-Gaussian (DoG) filter. To this end, calculating the first resultant image may include: applying a first Gaussian filter having a first standard deviation to the short-exposure image to obtain a first intermediate image, applying a second Gaussian filter having a second standard deviation to the short-exposure image to obtain a second intermediate image, and calculating a first resultant image by subtracting the second intermediate image from the first intermediate image; wherein calculating the second resultant image includes: applying the first Gaussian filter to the long-exposure image to obtain a third intermediate image, applying the second Gaussian filter to the long-exposure image to obtain a fourth intermediate image, and calculating a second resultant image by subtracting the fourth intermediate image from the third intermediate image, and wherein the first standard deviation is less than the second standard deviation, and the first standard deviation and the second standard deviation are greater than 0 and less than or equal to 0.5.

The first standard deviation may be greater than 0 and less than or equal to 0.1, and the second standard deviation may be greater than or equal to 0.2 and less than or equal to 0.38.

The method may further include, before the converting of the first resultant image and the second resultant image into the n-level images, subtracting an average value of the first resultant image from the first resultant image and subtracting an average value of the second resultant image from the second resultant image. The n-level images may have an odd number of levels that comprise 0 and are symmetrical with each other about 0, and deducing of the first n-level resultant image and the second n-level resultant image may include converting the first resultant image and the second resultant image into the n-level images by applying (n-2) threshold values symmetrically about 0 to convert pixel values of the first resulting image and the second resultant image into one of the odd number of levels.

The deducing of the PSF from the correlation map may include: deducing a threshold value in which a difference between a first image that is obtained by convolving the short-exposure image with the correlation map and the long-exposure image is minimal, the threshold value being with respect to a resultant value of the correlation map; and deducing the PSF from the correlation map by applying the deduced threshold value to the correlation map.

The deducing of the threshold value with respect to the resultant value of the correlation map may include deducing the threshold value by using a gradient descent method.

According to another embodiment, an apparatus for estimating a point spread function (PSF) includes: a global motion compensating unit that estimates a global motion between a short-exposure image and a long-exposure image that are continuously captured with different exposure times and that compensates for the global motion; a first resultant image calculating unit that calculates a first resultant image by applying a band pass filter to the short-exposure image; a second resultant image calculating unit that calculates a second resultant image by applying the band pass filter to the long-exposure image; an n-level image deducing unit that converts the first resultant image and the second resultant image into n-level images, where n is an odd natural number greater than or equal to 3, and that deduces a first n-level resultant image and a second n-level resultant image from the first resultant image and the second resultant image, respectively; a correlation map calculating unit that correlates the first n-level resultant image and the second n-level resultant image and that calculates a correlation map; and a PSF deducing unit that deduces the PSF from the correlation map.

The band pass filter may be a difference-of-Gaussian (DoG) filter. To this end, the first resultant image calculating unit may apply a first Gaussian filter having a first standard deviation to the short-exposure image to obtain a first intermediate image, may apply a second Gaussian filter having a second standard deviation to the short-exposure image to obtain a second intermediate image, and may calculate a first resultant image by subtracting the second intermediate image from the first intermediate image; wherein the second resultant image calculating unit may apply the first Gaussian filter to the long-exposure image to obtain a third intermediate image, may apply the second Gaussian filter to the long-exposure image to obtain a fourth intermediate image, and may calculate a second resultant image by subtracting the fourth intermediate image from the third intermediate image; and wherein the first standard deviation is less than the second standard deviation, and the first standard deviation and the second standard deviation is greater than 0 and less than or equal to 0.5.

The first standard deviation may be greater than 0 and less than or equal to 0.1, and the second standard deviation may be greater than or equal to 0.2 and less than or equal to 0.38.

The n-level image deducing unit, before the first resultant image and the second resultant image are converted into the n-level images, may subtract an average value of the first resultant image from the first resultant image and may subtract an average value of the second resultant image from the second resultant image, and may deduce the n-level images from the first resultant image and the second resultant image from which average values are subtracted. The n-level images may have an odd number of levels that comprise 0 and are symmetrical with each other about 0. The n-level image deducing unit may convert the first resultant image and the second resultant image into the n-level images by applying (n-2) threshold values symmetrically about 0 to convert pixel values of the first resultant image and the second resultant image into one of the odd number of levels.

The PSF deducing unit may include: a threshold value deducing unit that deduces a threshold value in which a difference between a first image that is obtained by convolving the short-exposure image with the correlation map and the long-exposure image is minimal, the threshold value being with respect to a resultant value of the correlation map; and a PSF determining unit that deduces the PSF from the correlation map by applying the deduced threshold value to the correlation map.

The threshold value deducing unit may deduce the threshold value by using a gradient descent method.

According to another embodiment, a non-transitory computer readable storage medium has stored thereon a program executable by a processor for performing the method of estimating a point spread function (PSF).

According to another embodiment, a method of controlling a digital photographing apparatus includes: continuously capturing a short-exposure image and a long-exposure image having different exposure times in response to one shutter-release button input; and estimating a point spread function (PSF) from the short-exposure image and the long-exposure image, wherein the short-exposure image has a shorter exposure time than the long-exposure image, wherein a gain value of an imaging unit with respect to the short-exposure image is greater than a gain value of the imaging unit with respect to the long-exposure image, and wherein a sum of the exposure times of the short-exposure image and the long-exposure image is determined depending on an exposure time set when the shutter-release button is input.

The estimating of the PSF from the short-exposure image and the long-exposure image may include: estimating a global motion between the short-exposure image and the long-exposure image, and compensating for the global motion; calculating a first resultant image by applying a band pass filter to the short-exposure image; calculating a second resultant image by applying the band pass filter to the long-exposure image; converting the first resultant image and the second resultant image into n-level images, where n is an odd natural number greater than or equal to 3, by deducing a first n-level resultant image and a second n-level resultant image from the first resultant image and the second resultant image, respectively; correlating the first n-level resultant image and the second n-level resultant image, and calculating a correlation map; and deducing the PSF from the correlation map.

According to another embodiment, a digital photographing apparatus includes: an imaging unit; an imaging unit controller that continuously captures a short-exposure image and a long-exposure image having different exposure times in response to one shutter-release button input; and an apparatus for estimating a point spread function (PSF) that uses the short-exposure image and the long-exposure image to estimate the PSF of a captured image with respect to the shutter-release button input, wherein the short-exposure image has a shorter exposure time than the long-exposure image, wherein a gain value of the imaging unit with respect to the short-exposure image is greater than a gain value of the imaging unit with respect to the long-exposure image, and wherein a sum of the exposure times of the short-exposure image and the long-exposure image is determined depending on an exposure time set when the shutter-release button is input.

The apparatus for estimating a PSF may include: a global motion compensating unit that estimates a global motion between the short-exposure image and the long-exposure image, and that compensates for the global motion; a first resultant image calculating unit that calculates a first resultant image by applying a band pass filter to the short-exposure image; a second resultant image calculating unit that calculates a second resultant image by applying the band pass filter to the long-exposure image; an n-level image deducing unit that converts the first resultant image and the second resultant image into n-level images, where n is an odd natural number greater than or equal to 3, and that deduces a first n-level resultant image and a second n-level resultant image from the first resultant image and the second resultant image, respectively; a correlation map calculating unit that correlates the first n-level resultant image and the second n-level resultant image, and that calculates a correlation map; and a PSF deducing unit that deduces the PSF from the correlation map.

BRIEF DESCRIPTION OF THE DRAWINGS

The above and other features and advantages will become more apparent by describing in detail exemplary embodiments with reference to the attached drawings in which:

FIG. 1 is a block diagram of a digital photographing apparatus, according to an embodiment;

FIG. 6A illustrates an operation of compensating for the global motion between a short-exposure image and a long-exposure image, according to an embodiment;

FIG. 6B illustrates the equation of the Affine motion compensation method, according to an embodiment;

DETAILED DESCRIPTION

Figure 2A:
FIGS. 2A and 2B are exemplary images for explaining a concept of a point spread function (PSF)

Exemplary embodiments will now be described more fully with reference to the accompanying drawings. The invention may, however, be embodied in many different forms and should not be construed as being limited to the embodiments set forth herein.

FIG. 1 is a block diagram of a digital photographing apparatus 100, according to an embodiment. Referring to FIG. 1, the digital photographing apparatus 100 according to the present embodiment includes an optical unit 110, a lens driving unit 111, an iris diaphragm 112, an iris diaphragm driving unit 113, an imaging unit 115, an imaging unit controller 116, an analog signal processor 120, a program storing unit 130, a buffer 140, a data storing unit 150, a display driving unit 162, a display unit 164, a digital signal processor (DSP) 170, and a manipulation unit 180.

The optical unit 110 condenses an optical signal. The optical unit 110 includes a zoom lens that narrows or widens a viewing angle, and a focus lens that focuses on a subject. Each of the zoom lens and the focus lens may include one or more lenses.

The iris diaphragm driving unit 113 controls the degree of opening and closing of the iris diaphragm 112 in order to adjust the quantity of incident light.

The lens driving unit 111 and the iris diaphragm driving unit 113 receive a control signal from the DSP 170 to drive the optical unit 110 and the iris diaphragm 112, respectively. The lens driving unit 111 adjusts the position of the optical unit 110 to adjust the focal length so that the user can perform operations of automatic focusing (AF), zooming, and focus changing. The iris diaphragm driving unit 113 controls the degree of opening and closing of the iris diaphragm 112, for example, an f-number, so that the user can perform operations of AF, automatic exposure correction, focus changing, and controlling a depth of field (DOF).

When an optical signal that passes through the optical unit 110 reaches a light-receiving surface of the imaging unit 115, an image of the subject is formed thereon. The imaging unit 115 may be a charge-coupled device (CCD) or a complementary metal-oxide semiconductor image sensor (CIS) for converting an optical signal into an electrical signal. The sensitivity of the imaging unit 115 may be adjusted by the imaging unit controller 116. The imaging unit controller 116 may control the imaging unit 115 according to a control signal that is automatically generated due to a real-time input image signal, or according to a control signal that is manually input by a user's manipulation.

The exposure time of the imaging unit 115 is adjustable with a shutter (not shown). Examples of the shutter include a mechanical shutter that controls incidence of light by mechanically moving a shutter, and an electronic shutter that controls exposure by supplying an electrical control signal to the imaging unit 115.

The imaging unit controller 116 may control the imaging unit 115 to capture a short-exposure image and a long-exposure image having different exposure times continuously in response to one shutter-release button input. The short-exposure image has a shorter exposure time than the long-exposure image, and a gain value of the imaging unit 115 with respect to the short-exposure image is greater than a gain value of the imaging unit 115 with respect to the long-exposure image. Also, the imaging unit controller 116 may adjust a film sensitivity value (ISO value) according to the exposure times of the short-exposure image and the long-exposure image.

The exposure time of the short-exposure image and the exposure time of the long-exposure image are determined according to an exposure time set by the digital photographing apparatus 100. The sum of the exposure times of the short-exposure image and the long-exposure image may be set to be the same as the exposure time set by the digital photographing apparatus 100. For example, when the exposure time set by the digital photographing apparatus 100 is one second, the exposure time of the short-exposure image may be 100 msec, and the exposure time of the long-exposure image may be 900 msec.

When the digital photographing apparatus 100 uses the mechanical shutter, a shutter controller (not shown) may move the mechanical shutter continuously twice and adjust the exposure time in response to one shutter-release button input so that the digital photographing apparatus 100 may capture the short-exposure image and the long-exposure image.

When the digital photographing apparatus 100 includes the electronic shutter, the imaging unit controller 116 may control the electronic shutter so that the digital photographing apparatus 100 may capture the short-exposure image and the long-exposure image continuously.

The analog signal processor 120 performs noise reduction, gain control, waveform shaping, and analog-digital conversion on an analog signal supplied from the imaging unit 115.

A control signal is input thorough the manipulation unit 180 by the user. The manipulation unit 180 may include a shutter-release button for inputting a shutter-release signal used to perform a photographing operation by exposing the imaging unit 115 for a predetermined amount of time, a power button for inputting a control signal used to control the turn-on or turn-off of the digital photographing apparatus 100, a wide-angle-zoom button and a telephoto-zoom button for enlarging or reducing a viewing angle according to a user's input, and various functional buttons for selecting at least one mode/function from the group consisting of a text input mode, a photographing mode, a reproduction mode, a white balance setting function, and an exposure setting function. The manipulation unit 180 may have various types of buttons, or may include a keyboard, a touch pad, a touch screen, a remote controller, or the like.

Also, the digital photographing apparatus 100 includes the program storing unit 130 that stores a program of an operating system or an application system for driving the digital photographing apparatus 100, the buffer 140 that temporarily stores data that is needed during calculations or resultant data, and the data storing unit 150 that stores various information needed in the program, as well as an image file including an image signal.

Furthermore, the digital photographing apparatus 100 includes the display unit 164 that displays an operating state of the digital photographing apparatus 100 or information about an image captured by the digital photographing apparatus 100. The display unit 164 may provide audio-visual information to the user. In order to provide the visual information, the display unit 164 may include a liquid crystal display (LCD) or an organic light-emitting diode (OLED) display device. The display driving unit 162 supplies a driving signal to the display unit 164.

Also, the DSP 170 processes an input image signal, and controls the elements of the digital photographing apparatus 100 according to the input image signal or an external input signal. The DSP 170 performs image signal processing for improving the quality of an image, such as noise reduction in input image data, Gamma correction, color filter array interpolation, color matrix correction, color correction, and color enhancement. Also, the DSP 170 generates an image file by compressing image data that is generated during the image signal processing for improving the quality of an image, or restores the image data from the image file. The image data is compressed in a reversible or a non-reversible format. As an example of an appropriate format for compressing the image data, the image data may be compressed in a joint photographic experts group (JPEG) format such as JPEG 2000. The compressed data may be stored in the data storing unit 150.

The DSP 170 also performs unclearness processing, color processing, blur processing, edge emphasis processing, image interpretation processing, image recognition processing, image effect processing, etc, wherein the image recognition processing may include face recognition processing or scene recognition processing. The DSP 170 also performs display image signal processing so as to display the operating state of the digital photographing apparatus 100 or the information about an image captured by the digital photographing apparatus 100 on the display unit 164. For example, the DSP 170 performs brightness level adjustment, color correction, contrast adjustment, contour emphasis adjustment, screen division processing, and character image generation and synthesis processing. The DSP 170 is connected to an external monitor and performs predetermined image signal processing so that a predetermined image may be displayed on the external monitor, and transmits the processed image data to the external monitor so as to display the predetermined image on the external monitor.

Also, the DSP 170 executes the program stored in the program storing unit 130, or includes an additional module to generate a control signal for use in automatic focusing, zooming, focus changing, and automatic exposure correction, and to provide the control signal to the lens driving unit 111, the iris diaphragm driving unit 113, and the imaging unit controller 116, and thus control operations of the elements of the digital photographing apparatus 100 such as the shutter, a flash (not illustrated), etc.

The DSP 170 may include an apparatus 172 that estimates a point spread function (PSF) for correcting shake of the short-exposure image and the long-exposure image that are captured by the imaging unit 115.

Figure 2B:
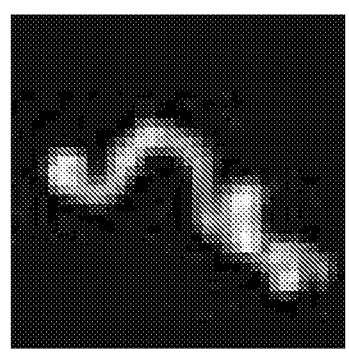

FIGS. 2A and 2B are exemplary images for explaining a concept of the PSF. Referring to FIG. 2, when the digital photographing apparatus 100 operates while being held by the user's hands, blur occurs in a captured image during exposure of the imaging unit 115 due to hand tremble. This blur is referred to as motion blur and is shown in FIGS. 2A and 2B. FIG. 2A represents a full frame image showing motion blur, while FIG. 2B represents an enlarged portion of the full frame image of FIG. 2A, showing the motion blur in greater detail.

In detail, FIGS. 2A and 2B represent an image in which a point light source is photographed at an exposure time of one second. The point light source would be photographed as one point (e.g., one pixel) if shake of the digital photographing apparatus 100 does not occur while the imaging unit 115 is exposed. However, when shake occurs during the exposure time, as illustrated in FIG. 2A, the shake causes a path of pixels representing the point light source to form in the captured image, as illustrated in FIG. 2B.

The PSF is a function that represents the shake path and may be obtained using Equation 1:

$$B = \text{PSF} \otimes L + N \quad \text{(Equation 1)}$$

where B is an image in which blur occurs, and L is an image in which blur does not occur, and N is white Gaussian noise. That is, the PSF is a function in which a blurred image is formed when the PSF is convolved with the image L in which blur does not occur. The PSF may be represented as an image indicative of the shake path, as illustrated in FIG. 2B.

The PSF may be estimated using a gyro sensor or an image. The PSF is estimated using the gyro sensor by measuring angular velocity while an image is exposed and by converting a value of the measured angular velocity into the quantity of movement in horizontal and vertical directions.

Figure 3:
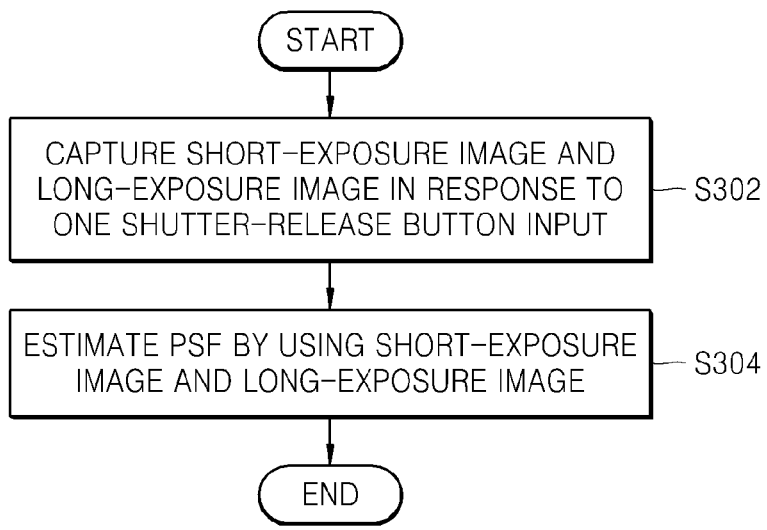
FIG. 3 is a flowchart illustrating a method of controlling the digital photographing apparatus of FIG. 1, according to an embodiment.

FIG. 3 is a flowchart illustrating a method of controlling the digital photographing apparatus 100 of FIG. 1, according to an embodiment. Referring to FIG. 3, in Operation S302, a short-exposure image and a long-exposure image are continuously captured in response to one shutter-release button input. The shutter-release button input may be performed by the manipulation unit 180. The short-exposure image has a shorter exposure time than the long-exposure image, and a gain value of the imaging unit 115 with respect to the short-exposure image is greater than a gain value of the imaging unit 115 with respect to the long-exposure image. For example, an ISO value of the short-exposure image may be greater than an ISO value of the long-exposure image.

Figure 4A:
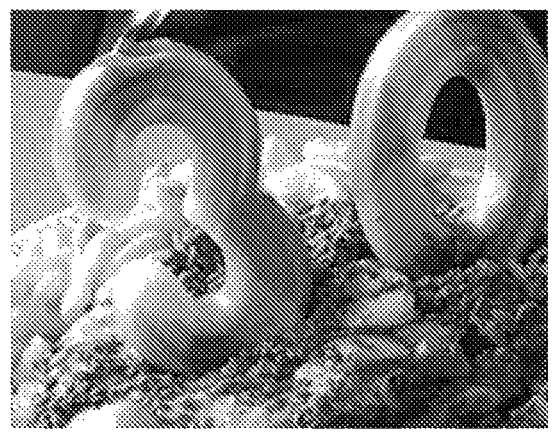
FIG. 4A is an exemplary short-exposure image and FIG. 4B is an exemplary long-exposure image.
Figure 4B:
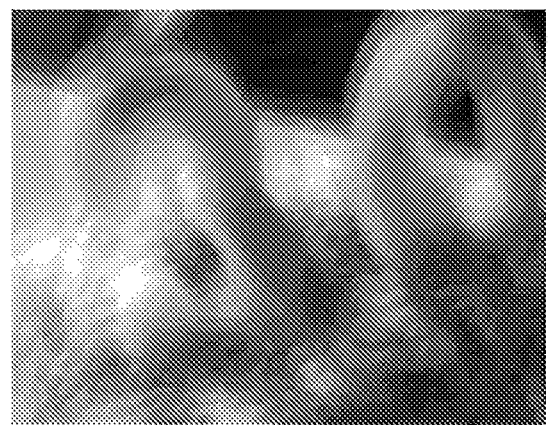

FIG. 4A is an exemplary short-exposure image and FIG. 4B is an exemplary long-exposure image. As illustrated in FIG. 4A, shake of the short-exposure image is relatively less, and edge portions of the short-exposure image are clearly shown. However, the short-exposure image has a high ISO value and thus has a high noise level. Blur due to shake occurs in the long-exposure image shown in FIG. 4B. However, the long-exposure image has a low ISO value and thus has a low noise level.

Next, in Operation S304, the PSF is estimated using the short-exposure image and the long-exposure image. The operation of estimating the PSF will now be described with reference to FIG. 5.

Figure 5:
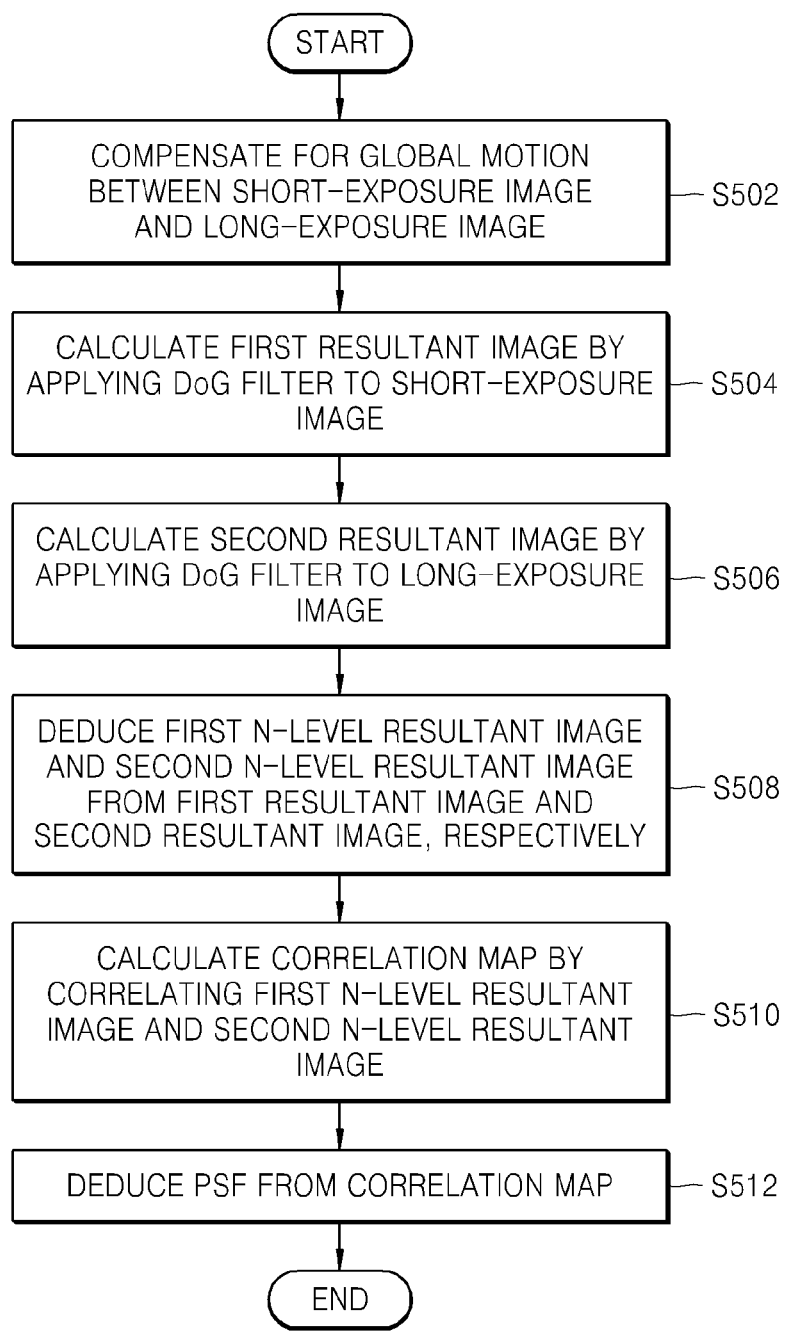
FIG. 5 is a flowchart illustrating a method of estimating a PSF, according to an embodiment.

FIG. 5 is a flowchart illustrating a method of estimating the PSF, according to an embodiment. Referring to FIG. 5, in Operation 502, a global motion between a short-exposure image and a long-exposure image is compensated for, where the global motion is a phenomenon that the position of the digital photographing apparatus 100 of FIG. 1 is changed while the short-exposure image and the long-exposure image are captured and thus the entire set of pixels are shifted. Compensating for the global motion is compensating for a shift of the entire set of pixels so that pixels of the short-exposure image and the long-exposure are aligned to correspond to each other.

FIG. 6A illustrates an operation of compensating for the global motion between a short-exposure image 602 and a long-exposure image 604, according to an embodiment.

The short-exposure image 602 and the long-exposure image 604 are continuously captured. However, they are captured at different times and thus the global motion between the short-exposure image 602 and the long-exposure image 604 may occur. For example, as illustrated in FIG. 6A, the digital photographing apparatus 100 of FIG. 1 is slightly rotated while the short-exposure image 602 and the long-exposure image 604 are captured. Then, in the short-exposure image 602, a rectangular subject may be photographed in a horizontal direction, and in the long-exposure image 604, the rectangular subject may be photographed while the digital photographing apparatus 100 of FIG. 1 is rotated counter-clockwise. In this case, in order to compensate for the global motion between the short-exposure image 602 and the long-exposure image 604, a center of one image is aligned with the center of the other image. For example, when the long-exposure image 604 is aligned centrally on the short-exposure image 602, the long-exposure image 604 may be rotated clockwise, and the global motion may be compensated for, as illustrated in FIG. 6A. The global motion may be compensated for by using various methods including estimating parameters of an Affine motion, for example.

FIG. 6B illustrates the equation of the Affine motion compensation method, according to an embodiment. The Affine motion converts a coordinate value (x, y) before the global motion is compensated for, into a coordinate value (x', y') after the global motion is estimated, as illustrated in FIG. 6B. To this end, six parameters a, b, c, d, e, and f for Affine conversion are estimated. Through Affine conversion, parallel movement between the short-exposure image 602 and the long-exposure image 604, rotation movement therebetween, a change of sizes thereof, shear thereof or the like may be compensated for. In the present embodiment, a coordinate value of the Affine-converted long-exposure image 604 may be obtained using Equation 2:

$$x'=ax+by+c$$

$$y'=dx+ey+f \quad \text{(Equation 2)}$$

Thus, when one of the short-exposure image 602 and the long-exposure image 604 is converted using Affine conversion, the global motion between the short-exposure image 602 and the long-exposure image 604 is compensated for.

When the global motion is compensated for, in Operation S504, a first resultant image is calculated by applying a difference-of-Gaussian (DoG) filter to the short-exposure image 602, and in Operation S506, a second resultant image is calculated by applying the DoG filter to the long-exposure image 604. The operation of calculating the first resultant image (S504) and the operation of calculating the second resultant image (S506) does not need to be sequentially performed and may be performed simultaneously.

According to the present embodiment, the DoG filter is applied to the short-exposure image 602 and the long-exposure image 604. The DoG filter is a kind of band pass filter and is implemented using two Gaussian low pass filters (LPFs).

Figure 7A:
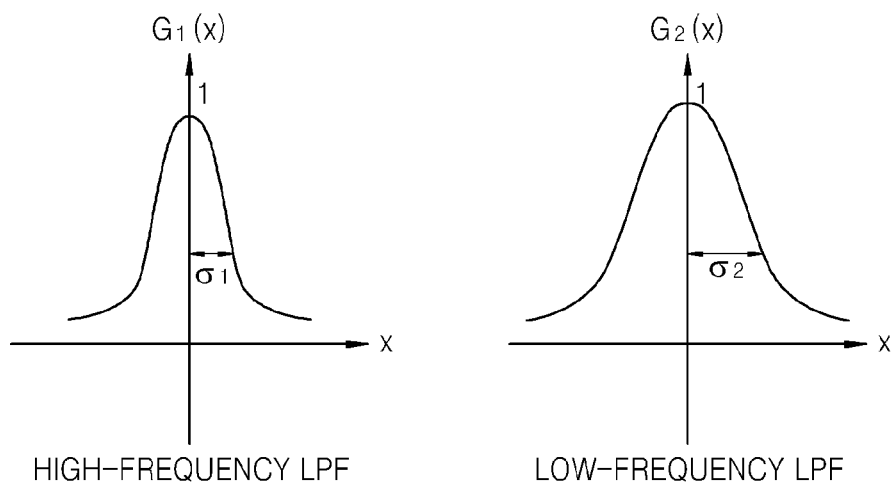
FIGS. 7A and 7B are graphs for explaining a difference-of-Gaussian (DoG) filter, according to an embodiment.
Figure 7B:
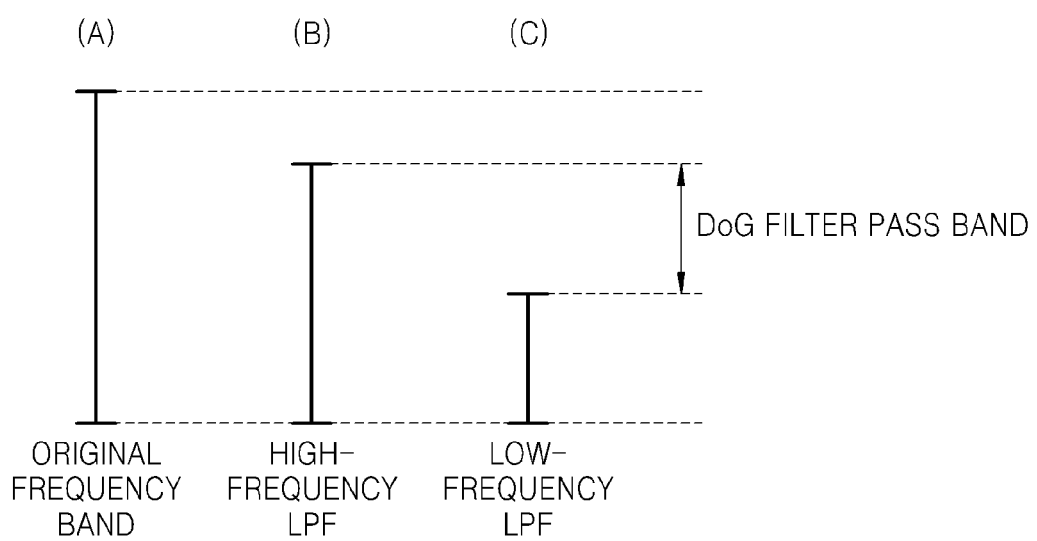

FIGS. 7A and 7B are graphs for explaining a DoG filter, according to an embodiment. The DoG filter is implemented using two Gaussian LPFs, as illustrated in FIG. 7A. The two Gaussian LPFs may be a high-frequency LPF and a low-frequency LPF each having a standard deviation; specifically, the high-frequency LPF has a first standard deviation σ1 and the low-frequency LPF has a second standard deviation σ2, where the first standard deviation σ1 is less than the second standard deviation σ2. The first standard deviation σ1 and the second standard deviation σ2 may be selected to improve a performance for estimating the PSF. In the present embodiment, the DoG filter is applied to an input image to obtain a resultant image by first convolving the input image with the high-frequency LPF of FIG. 7A to form a first intermediate image, convolving the input image with the low-frequency LPF of FIG. 7A to form a second intermediate image, and then subtracting the second intermediate image from the first intermediate image to form the resultant image.

The application of the DoG filter to the input image produces an effect in the resulting image similar to that of a band pass filter being applied to the input image. As illustrated in FIG. 7B, when an original frequency band included in an input image is (A), if a resultant image of applying the low-frequency LPF having a frequency band (C) is subtracted from a resultant image of applying the high-frequency LPF having a frequency band (B), a resultant image of the DoG filter having a frequency band of a DoG pass band filter illustrated in FIG. 7B is calculated. Thus, the DoG filter serves as a band pass filter.

According to another embodiment, the first standard deviation σ1 and the second standard deviation σ2 may be greater than 0 and less than or equal to 0.5. Also, the first standard deviation σ1 may be greater than 0 and less than or equal to 0.1, and the second standard deviation σ2 may be greater than or equal to 0.2 and less than or equal to 0.38. For example, the first standard deviation σ1 may be approximately 0, and the second standard deviation σ2 may be 0.38. Alternatively, the first standard deviation σ1 may be 0.1, and the second standard deviation σ2 may be 0.2.

After the first resultant image and the second resultant image are calculated, in Operation S508, a first n-level resultant image is deduced from the first resultant image, and a second n-level resultant image is deduced from the second resultant image, where n is an odd natural number greater than or equal to 3. According to an embodiment, the first resultant image and the second resultant image to which the DoG filter is applied are converted into n-level images so that edge portions and non-edge portions of the first and second resultant images may be equally processed. Generally, blur occurs severely in strong edge portions of an image, and even if shake occurs, it is difficult to observe a blurred image in weak edge portions of the image. According to an embodiment, the first and second resultant images to which the DoG filter is applied are converted into the n-level images so that the strongly-edged portions and the weak edge portions of the first and second resultant images may be equally processed and imbalance of motion compensation due to the strength and weakness of edges may be prevented.

According to another embodiment, before the first resultant image and the second resultant image are converted into the n-level images, the method further includes subtracting an average value of the first resultant image from the first resultant image and subtracting an average value of the second resultant image from the second resultant image. Also, when the n-level images are obtained from the first resultant image and the second resultant image from which average values are subtracted, the n-level images are obtained using (n-2) threshold values that are applied in symmetry about 0. The n-level images may have an odd number of levels that include 0 and are symmetrical with each other about 0. In the present embodiment, the average value is subtracted from each of the first resultant image and the second resultant image so that subsequent operations may be performed using an image having an average value of 0.

For example, each of the first resultant image and the second resultant image from which the average values are subtracted may be converted into a three-level resultant image using a single (3−2=1) threshold value $\alpha$. In other words, the threshold value $\alpha$ is applied to pixels of each of the images in symmetry about 0. In each of the three-level resultant images, the pixels have a value of $\alpha$, 0, or $-\alpha$. The threshold value $\alpha$ is an appropriate natural number and may be 40, for example. A first three-level resultant image and a second three-level resultant image may be deduced by applying Equation 3 to the pixels in the first resultant image and the second resultant image from which the average values are subtracted. Pixels having the value of 0 in the three-level image represent edges.

$$\text{Three-level pixel} = \begin{cases} 0 & \text{if pixel value} = 0 \\ \alpha & \text{if pixel value} > 0 \\ -\alpha & \text{if pixel value} < 0 \end{cases} \quad \text{(Equation 3)}$$

Figure 8A:
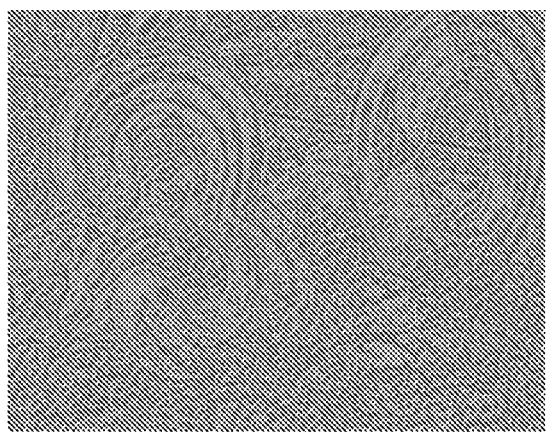
FIGS. 8A and 8B are three-level video images, according to another embodiment.
Figure 8B:

FIGS. 8A and 8B are three-level video images, according to another embodiment. As described above, the short-exposure image and the long-exposure image are converted into three-level images, and in order to express the three-level short-exposure image and the three-level long-exposure image as video images, an offset of 128 is added to each pixel value, as illustrated in FIGS. 8A and 8B. As illustrated in FIGS. 8A and 8B, edge portions and non-edge portions are expressed in the three-level video images regardless of strength and weakness of edges.

After the first n-level resultant image and the second n-level resultant image are deduced from the first resultant image and the second resultant image, respectively, in Operation S508, the first n-level resultant image and the second n-level resultant image are correlated, and a correlation map is calculated in Operation S510. The correlation map is calculated by representing resultant values that are obtained by correlating the first n-level resultant image and the second n-level resultant image according to the position of correlation.

Figure 9:
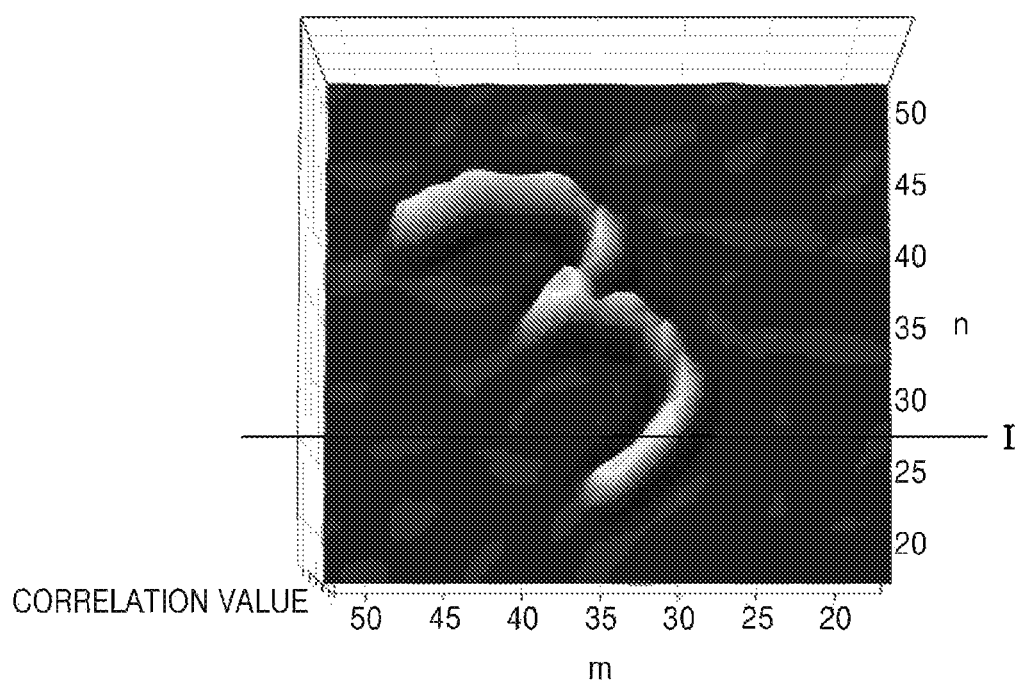
FIG. 9 is a correlation map of a first n-level resultant image and a second n-level resultant image, according to an embodiment.

FIG. 9 is a correlation map of a first n-level resultant image and a second n-level resultant image, according to an embodiment. Referring to FIG. 9, the correlation map may be obtained by correlating the first n-level resultant image and the second n-level resultant image, and this procedure may be referred to as template matching. The first n-level resultant image and the second n-level resultant image may be correlated over the entire region or in a predetermined region range. When the first n-level resultant image and the second n-level resultant image are correlated in a predetermined region range, they may be correlated in the range where shake may occur. FIG. 9 is the correlation map of the three-level video image of FIG. 8A and the three-level video image of FIG. 8B. Template correlation is performed in the range of 0-50 in latitudinal and longitudinal directions.

As illustrated in FIG. 9, the correlation map represents large correlation values in predetermined positions, where positions in which the correlation values of the correlation map are large, represent the shake path. Thus, the correlation map represents the characteristic of the PSF.

According to another embodiment, correlation that is to be performed to obtain the correlation map may be the normalized sum of squared difference (SSD) or the zero-mean normalized cross correlation (ZNCC).

Next, in Operation S512, the PSF is deduced from the correlation map. The correlation map has correlation values that vary according to positions. In order to define the PSF, a threshold value is applied to the correlation map, and only a correlation value having a value greater than the threshold value is taken as the PSF, and a correlation value having a value smaller than the threshold value is discarded.

Figure 10:
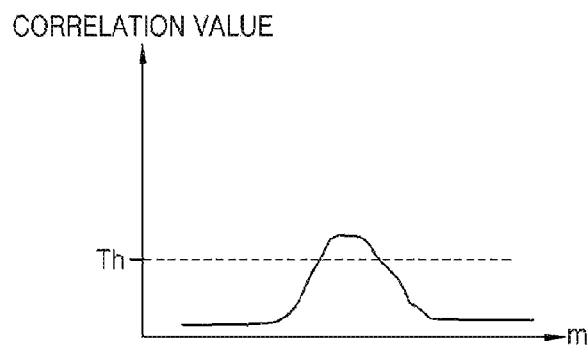
FIG. 10 is a graph showing a threshold value applied to a line of the correlation map of FIG. 9.

FIG. 10 is a graph showing a threshold value Th applied to a line I of the correlation map of FIG. 9. When the correlation map shown in FIG. 9 is taken along line I, a two-dimensional graph may be constituted, as shown in FIG. 10. In order to determine the PSF, a threshold value Th needs to be determined. The threshold value Th may be determined to obtain a PSF in which a difference between a first image that is obtained by convolving an unshaken image L with the PSF and a blurred image B is smallest, as shown in Equation 4:

$$\text{PSF*} = \arg_{PSF} \min \| B - \text{PSF} \otimes L \| \quad \text{(Equation 4)}$$

According to an embodiment, a long-exposure image is used as the blurred image B, and a short-exposure image is used as the unshaken image L, and the correlation map may be used as an initial value of the PSF. In order to obtain a PSF in which a cost function of Equation 4, $\| B - \text{PSF} \otimes L \|$, is minimal, the PSF needs to be searched through repetitive processing.

Figure 11:
FIG. 11 is a correlation map indicated by 256 gray scales, according to an embodiment.
Figure 12:
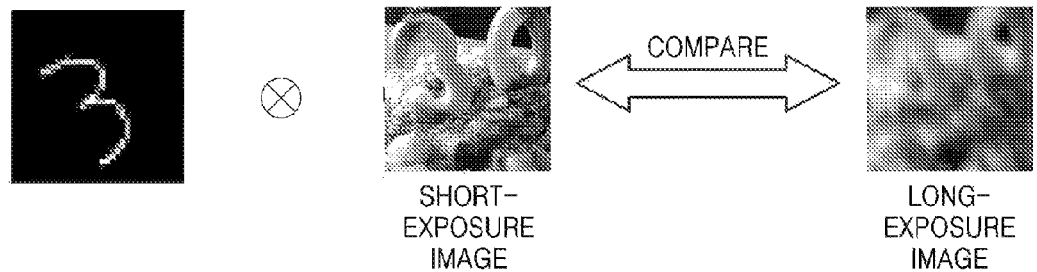
FIG. 12 shows a set of images for explaining an operation of estimating a PSF, according to an embodiment.

FIG. 11 is a correlation map indicated by 256 gray scales, according to an embodiment. FIG. 12 shows a set of images for explaining an operation of estimating the PSF, according to an embodiment. As an example, the correlation map of FIG. 9 may be expressed as an image having 256 gray scales as illustrated in FIG. 11. Next, as illustrated in FIG. 12, while an estimated threshold value Th varies, the estimated PSF and the short-exposure image are convolved with each other, and the convolved short-exposure image is compared with the long-exposure image, and thus a threshold value Th corresponding to the PSF in which the cost function is minimal may be obtained.

Figure 13:
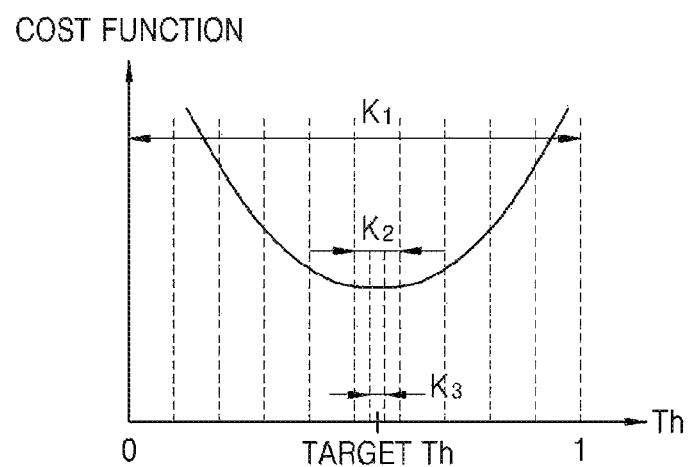
FIG. 13 is a graph for explaining an operation of searching for a threshold value by using a gradient descent method, according to an embodiment.
Figure 14:
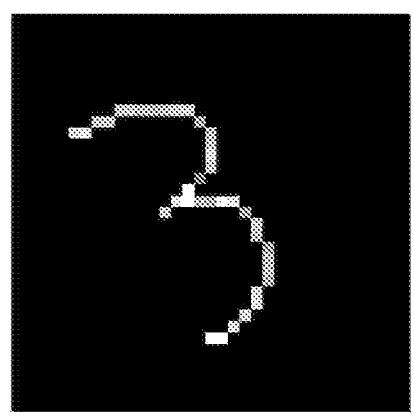
FIG. 14 is an image of a PSF estimated by searching for a threshold value by using a gradient descent method, according to an embodiment.

According to another embodiment, the PSF in which the cost function is minimal is searched using a gradient descent method. FIG. 13 is a graph for explaining an operation of searching for a threshold value by using a gradient descent method, according to an embodiment. FIG. 14 is an image of a PSF estimated by searching for a threshold value by using a gradient descent method, according to an embodiment.

Referring to FIG. 13, in order to search for the threshold value Th by using the gradient descent method, while a range where cost functions are obtained according to threshold values Th is reduced, a threshold value Th with which a cost function is minimal is searched. For example, first, a range $K_1$ is divided into ten parts, cost functions with respect to ten threshold values Th that are obtained by dividing the range $K_1$ into ten parts are obtained, and the threshold value Th with which the cost function is minimal is searched. Next, a range $K_2$, which is in the vicinity of the threshold value Th with which the cost function is minimal, is divided into ten parts, cost functions with respect to ten threshold values Th that are obtained by dividing the range $K_2$ into ten parts are obtained, and the threshold value Th with which the cost function is minimal is searched. By repeatedly performing this procedure, a target threshold value Th with which the cost function is minimal may be searched, and the PSF may be estimated using the target threshold value Th. Through this procedure, the PSF illustrated in FIG. 14 may be deduced.

Figure 15:
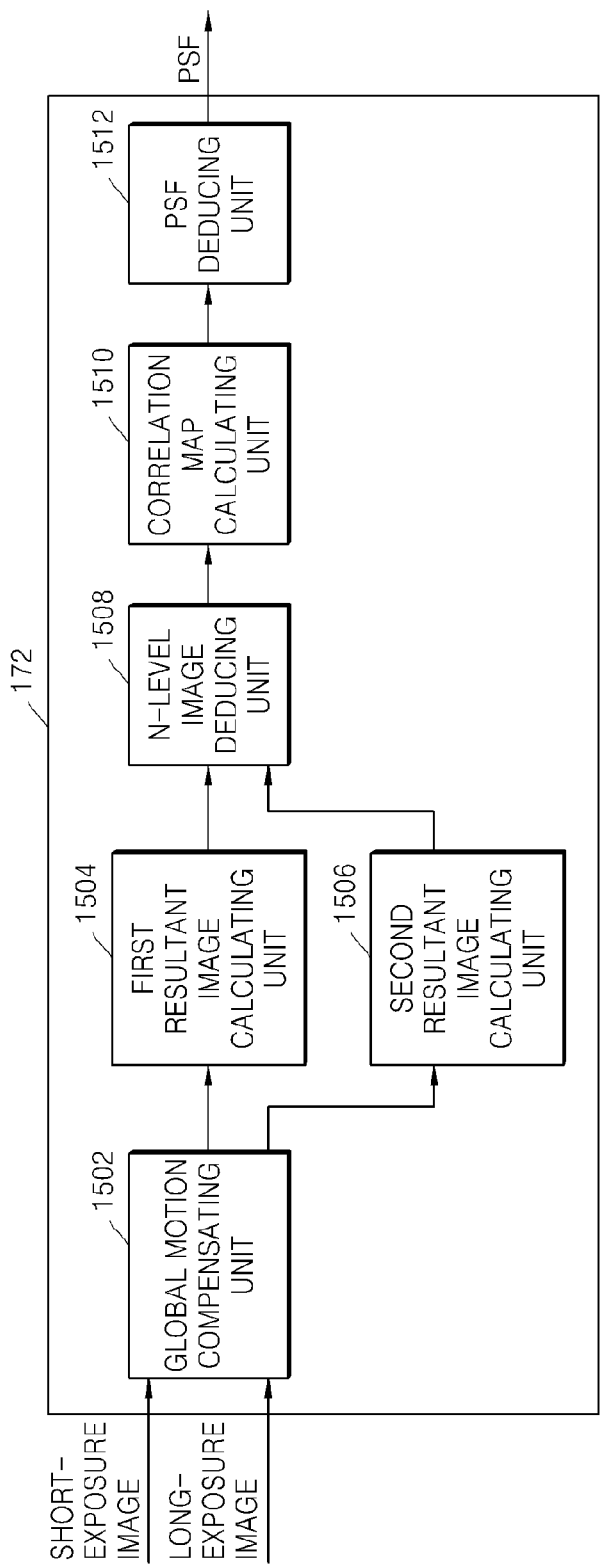
FIG. 15 is a block diagram of an apparatus for estimating a PSF of the digital photographing apparatus of FIG. 1, according to an embodiment.

FIG. 15 is a block diagram of the apparatus 172 for estimating the PSF of the digital photographing apparatus 100 of FIG. 1, according to an embodiment. Referring to FIG. 15, the apparatus 172 for estimating the PSF receives an input short-exposure image and an input long-exposure image and outputs a deduced PSF. The apparatus 172 may include a global motion compensating unit 1502, a first resultant image calculating unit 1504, a second resultant image calculating unit 1506, an n-level image deducing unit 1508, a correlation map calculating unit 1510, and a PSF deducing unit 1512.

The global motion compensating unit 1502 compensates for a global motion between the short-exposure image and the long-exposure image. The global motion compensating unit 1502 may compensate for the global motion by using Affine motion parameters, as described above with reference to FIGS. 6A and 6B.

The first resultant image calculating unit 1504 calculates a first resultant image by applying a DoG filter to the short-exposure image with the compensated global motion, and the second resultant image calculating unit 1506 calculates a second resultant image by applying the DoG filter to the short-exposure image with the compensated global motion. The DoG filter is a kind of band pass filter and is implemented using two Gaussian low pass filters (LPFs), as described previously with reference to FIGS. 7A and 7B.

According to another embodiment, a first standard deviation $\sigma 1$ and a second standard deviation $\sigma 2$ may be greater than 0 and less than or equal to 0.5. Also, the first standard deviation $\sigma 1$ may be greater than 0 and less than or equal to 0.1, and the second standard deviation $\sigma 2$ may be greater than or equal to 0.2 and less than or equal to 0.38. For example, the first standard deviation $\sigma 1$ may be approximately 0, and the second standard deviation $\sigma 2$ may be 0.38. Alternatively, the first standard deviation $\sigma 1$ may be 0.1, and the second standard deviation $\sigma 2$ may be 0.2.

The n-level image deducing unit 1508 deduces a first n-level resultant image from the first resultant image and a second n-level resultant image from the second resultant image.

According to another embodiment, before the first resultant image and the second resultant image are converted into the n-level images, the n-level image deducing unit 1508 may perform an operation of subtracting an average value of the first resultant image from the first resultant image and subtracting an average value of the second resultant image from the second resultant image. Also, when the n-level images are obtained from the first resultant image and the second resultant image from which average values are subtracted, the n-level image deducing unit 1508 may obtain the n-level images using (n-2) threshold values that are applied symmetrically about 0. Pixel values of the n-level images may have an odd number of levels that include 0 and are symmetrical with each other about 0. In the present embodiment, the average value is subtracted from each of the first resultant image and the second resultant image so that subsequent operations may be performed using an image having an average value of 0.

The correlation map calculating unit 1510 calculates a correlation map by correlating the first n-level resultant image and the second n-level resultant image.

According to another embodiment, correlation that is to be performed to obtain the correlation map may be the normalized SSD or the ZNCC.

Figure 16:
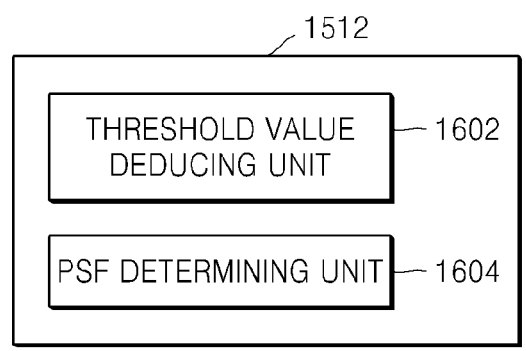
FIG. 16 is a block diagram of a PSF deducing unit of the apparatus for estimating the PSF of FIG. 15, according to an embodiment.

The PSF deducing unit 1512 deduces the PSF from the correlation map. FIG. 16 is a block diagram of the PSF deducing unit 1512 of the apparatus 172 for estimating the PSF of FIG. 15, according to an embodiment. The PSF deducing unit 1512 according to the present embodiment includes a threshold value deducing unit 1602 and a PSF determining unit 1604. The correlation map has correlation values that vary according to positions. In order to define the PSF, a threshold value is applied to the correlation map, and only a correlation value having a value greater than the threshold value is taken as the PSF, and a correlation value having a value smaller than the threshold value is discarded. The threshold value deducing unit 1602 obtains a threshold value in which the cost function of Equation 4 is minimal, as described above. The PSF determining unit 1604 determines the PSF by applying the threshold value obtained by the threshold value deducing unit 1602 to the correlation map.

The threshold value deducing unit 1602 according to another embodiment searches for a PSF in which the cost function is minimal, by using a gradient descent method.

According to various embodiments, a PSF is estimated using two images that are continuously captured using different exposure times so that the number of repetitive estimations when the PSF is estimated can be reduced.

Also, according to the embodiments, edge portions and non-edge portions of a captured image can be equally processed.

The apparatus described herein may comprise a processor (e.g., DSP 170), a memory for storing program data to be executed by the processor, a permanent storage such as a disk drive, a communications port for handling communications with external devices, and user interface devices, including a display, keys, etc. When software modules are involved, these software modules may be stored as program instructions or computer readable code executable by the processor on a non-transitory computer-readable media such as read-only memory (ROM), random-access memory (RAM), CD-ROMs, magnetic tapes, floppy disks, and optical data storage devices. The computer readable recording media may also be distributed over network coupled computer systems so that the computer readable code is stored and executed in a distributed fashion. This media can be read by the computer, stored in the memory, and executed by the processor.

All references, including publications, patent applications, and patents, cited herein are hereby incorporated by reference to the same extent as if each reference were individually and specifically indicated to be incorporated by reference and were set forth in its entirety herein.

For the purposes of promoting an understanding of the principles of the invention, reference has been made to the embodiments illustrated in the drawings, and specific language has been used to describe these embodiments. However, no limitation of the scope of the invention is intended by this specific language, and the invention should be construed to encompass all embodiments that would normally occur to one of ordinary skill in the art.

The invention may be described in terms of functional block components and various processing steps. Such functional blocks may be realized by any number of hardware and/or software components configured to perform the specified functions. For example, the invention may employ various integrated circuit components, e.g., memory elements, processing elements, logic elements, look-up tables, and the like, which may carry out a variety of functions under the control of one or more microprocessors or other control devices. Similarly, where the elements of the invention are implemented using software programming or software elements, the invention may be implemented with any programming or scripting language such as C, C++, Java, assembler, or the like, with the various algorithms being implemented with any combination of data structures, objects, processes, routines or other programming elements. Functional aspects may be implemented in algorithms that execute on one or more processors. Furthermore, the invention may employ any number of conventional techniques for electronics configuration, signal processing and/or control, data processing and the like. The words "mechanism" and "element" are used broadly and are not limited to mechanical or physical embodiments, but may include software routines in conjunction with processors, etc.

The particular implementations shown and described herein are illustrative examples of the invention and are not intended to otherwise limit the scope of the invention in any way. For the sake of brevity, conventional electronics, control systems, software development and other functional aspects of the systems (and components of the individual operating components of the systems) may not be described in detail. Furthermore, the connecting lines, or connectors shown in the various figures presented are intended to represent exemplary functional relationships and/or physical or logical couplings between the various elements. It should be noted that many alternative or additional functional relationships, physical connections or logical connections may be present in a practical device. Moreover, no item or component is essential to the practice of the invention unless the element is specifically described as "essential" or "critical". It will be recognized that the terms "comprising," "including," and "having," as used herein, are specifically intended to be read as open-ended terms of art.

The use of the terms "a" and "an" and "the" and similar referents in the context of describing the invention (especially in the context of the following claims) are to be construed to cover both the singular and the plural. Furthermore, recitation of ranges of values herein are merely intended to serve as a shorthand method of referring individually to each separate value falling within the range, unless otherwise indicated herein, and each separate value is incorporated into the specification as if it were individually recited herein. Finally, the steps of all methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. Numerous modifications and adaptations will be readily apparent to those of ordinary skill in this art without departing from the spirit and scope of the invention.

What is claimed is:

1. A method of estimating a point spread function (PSF), the method comprising:
    estimating a global motion between a short-exposure image and a long-exposure image that are continuously captured using different exposure times, and compensating for the global motion;
    calculating a first resultant image by applying a band pass filter to the short-exposure image;
    calculating a second resultant image by applying the band pass filter to the long-exposure image;
    converting the first resultant image and the second resultant image into n-level images, where n is an odd natural number greater than or equal to 3, by deducing a first n-level resultant image and a second n-level resultant image from the first resultant image and the second resultant image, respectively;
    correlating the first n-level resultant image and the second n-level resultant image, and calculating a correlation map; and
    deducing the PSF from the correlation map.

2. The method of claim 1,
    wherein calculating the first resultant image comprises:
        applying a first Gaussian filter having a first standard deviation to the short-exposure image to obtain a first intermediate image,
        applying a second Gaussian filter having a second standard deviation to the short-exposure image to obtain a second intermediate image, and
        calculating a first resultant image by subtracting the second intermediate image from the first intermediate image;
    wherein calculating the second resultant image comprises:
        applying the first Gaussian filter to the long-exposure image to obtain a third intermediate image,
        applying the second Gaussian filter to the long-exposure image to obtain a fourth intermediate image, and
        calculating a second resultant image by subtracting the fourth intermediate image from the third intermediate image; and
    wherein the first standard deviation is less than the second standard deviation, and the first standard deviation and the second standard deviation are both greater than 0 and less than or equal to 0.5.

3. The method of claim 2, wherein the first standard deviation is greater than 0 and less than or equal to 0.1, and the second standard deviation is greater than or equal to 0.2 and less than or equal to 0.38.

4. The method of claim 1, further comprising, before the converting of the first resultant image and the second resultant image into the n-level images, subtracting an average value of the first resultant image from the first resultant image and subtracting an average value of the second resultant image from the second resultant image.

5. The method of claim 4,
    wherein the n-level images have an odd number of levels that comprise 0 and are symmetrical with each other about 0, and
    wherein the deducing of the first n-level resultant image and the second n-level resultant image comprises converting the first resultant image and the second resultant image into the n-level images by applying (n-2) threshold values symmetrically about 0 to convert pixel values of the first resultant image and the second resultant image into one of the odd number of levels.

6. The method of claim 1, wherein the deducing of the PSF from the correlation map comprises:
    deducing a threshold value in which a difference between a first image that is obtained by convolving the short-exposure image with the correlation map and the long-exposure image is minimal, the threshold value being with respect to a resultant value of the correlation map; and
    deducing the PSF from the correlation map by applying the deduced threshold value to the correlation map.

7. The method of claim 6, wherein the deducing of the threshold value with respect to the resultant value of the correlation map comprises deducing the threshold value by using a gradient descent method.

8. An apparatus for estimating a point spread function (PSF), the apparatus comprising:
    a global motion compensating unit that estimates a global motion between a short-exposure image and a long-exposure image that are continuously captured with different exposure times and that compensates for the global motion;
    a first resultant image calculating unit that calculates a first resultant image by applying a band pass filter to the short-exposure image;
    a second resultant image calculating unit that calculates a second resultant image by applying the band pass filter to the long-exposure image;

an n-level image deducing unit that converts the first resultant image and the second resultant image into n-level images, where n is an odd natural number greater than or equal to 3, and that deduces a first n-level resultant image and a second n-level resultant image from the first resultant image and the second resultant image, respectively;

a correlation map calculating unit that correlates the first n-level resultant image and the second n-level resultant image, and that calculates a correlation map; and a PSF deducing unit that deduces the PSF from the correlation map.

9. The apparatus of claim 8,
wherein the first resultant image calculating unit
applies a first Gaussian filter having a first standard deviation to the short-exposure image to obtain a first intermediate image,
applies a second Gaussian filter having a second standard deviation to the short-exposure image to obtain a second intermediate image, and
calculates a first resultant image by subtracting the second intermediate image from the first intermediate image;
wherein the second resultant image calculating unit
applies the first Gaussian filter to the long-exposure image to obtain a third intermediate image,
applies the second Gaussian filter to the long-exposure image to obtain a fourth intermediate image,
and calculates a second resultant image by subtracting the fourth intermediate image from the third intermediate image; and
wherein the first standard deviation is less than the second standard deviation, and the first standard deviation and the second standard deviation are greater than 0 and less than or equal to 0.5.

10. The apparatus of claim 9, wherein the first standard deviation is greater than 0 and less than or equal to 0.1, and the second standard deviation is greater than or equal to 0.2 and less than or equal to 0.38.

11. The apparatus of claim 8, wherein the n-level image deducing unit, before the first resultant image and the second resultant image are converted into the n-level images, subtracts an average value of the first resultant image from the first resultant image and subtracts an average value of the second resultant image from the second resultant image, and deduces the n-level images from the first resultant image and the second resultant image from which average values are subtracted.

12. The apparatus of claim 11,
wherein the n-level images have an odd number of levels that comprise 0 and are symmetrical with each other about 0, and
wherein the n-level image deducing unit converts the first resultant image and the second resultant image into the n-level images by applying (n-2) threshold values symmetrically about 0 to convert pixel values of the first resultant image and the second resultant image into one of the odd number of levels.

13. The apparatus of claim 8, wherein the PSF deducing unit comprises:
a threshold value deducing unit that deduces a threshold value in which a difference between a first image that is obtained by convolving the short-exposure image with the correlation map and the long-exposure image is minimal, the threshold value being with respect to a resultant value of the correlation map; and a PSF determining unit that deduces the PSF from the correlation map by applying the deduced threshold value to the correlation map.

14. The apparatus of claim 13, wherein the threshold value deducing unit deduces the threshold value by using a gradient descent method.

15. A non-transitory computer readable storage medium having stored thereon a program executable by a processor for performing a method of estimating a point spread function (PSF), wherein the method comprises:
estimating a global motion between a short-exposure image and a long-exposure image that are continuously captured using different exposure times, and compensating for the global motion;
calculating a first resultant image by applying a band pass filter to the short-exposure image;
calculating a second resultant image by applying the band pass filter to the long-exposure image;
converting the first resultant image and the second resultant image into n-level images, where n is an odd natural number greater than or equal to 3, by deducing a first n-level resultant image and a second n-level resultant image from the first resultant image and the second resultant image, respectively;
correlating the first n-level resultant image and the second n-level resultant image, and calculating a correlation map; and
deducing the PSF from the correlation map.

16. The non-transitory computer readable storage medium of claim 15, wherein calculating the first resultant image comprises:
applying a first Gaussian filter having a first standard deviation to the short-exposure image to obtain a first intermediate image,
applying a second Gaussian filter having a second standard deviation to the short-exposure image to obtain a second intermediate image, and
calculating a first resultant image by subtracting the second intermediate image from the first intermediate image;
wherein calculating the second resultant image comprises:
applying the first Gaussian filter to the long-exposure image to obtain a third intermediate image,
applying the second Gaussian filter to the long-exposure image to obtain a fourth intermediate image, and
calculating a second resultant image by subtracting the fourth intermediate image from the third intermediate image; and
wherein the first standard deviation is less than the second standard deviation, and the first standard deviation and the second standard deviation are both greater than 0 and less than or equal to 0.5.

17. The non-transitory computer readable storage medium of claim 16, wherein the first standard deviation is greater than 0 and less than or equal to 0.1, and the second standard deviation is greater than or equal to 0.2 and less than or equal to 0.38.

18. The non-transitory computer readable storage medium of claim 15, wherein the method further comprises, before the converting of the first resultant image and the second resultant image into the n-level images, subtracting an average value of the first resultant image from the first resultant image and subtracting an average value of the second resultant image from the second resultant image.

19. The non-transitory computer readable storage medium of claim 18, wherein the n-level images have an odd number of levels that comprise 0 and are symmetrical with each other about 0, and wherein the deducing of the first n-level resultant image and the second n-level resultant image comprises converting the first resultant image and the second resultant image into the n-level images by applying (n-2) threshold values symmetrically about 0 to convert pixel values of the first resultant image and the second resultant image into one of the odd number of levels.

20. The non-transitory computer readable storage medium of claim 15, wherein the deducing of the PSF from the correlation map comprises:

deducing a threshold value in which a difference between a first image that is obtained by convolving the short-exposure image with the correlation map and the long-exposure image is minimal, the threshold value being with respect to a resultant value of the correlation map; and deducing the PSF from the correlation map by applying the deduced threshold value to the correlation map.

21. The non-transitory computer readable storage medium of claim 20, wherein the deducing of the threshold value with respect to the resultant value of the correlation map comprises deducing the threshold value by using a gradient descent method.

22. A method of controlling a digital photographing apparatus, the method comprising:

continuously capturing a short-exposure image and a long-exposure image having different exposure times in response to one shutter-release button input; and estimating a point spread function (PSF) from the short-exposure image and the long-exposure image, wherein the short-exposure image has a shorter exposure time than the long-exposure image, wherein a gain value of an imaging unit with respect to the short-exposure image is greater than a gain value of the imaging unit with respect to the long-exposure image, and wherein a sum of the exposure times of the short-exposure image and the long-exposure image is determined depending on an exposure time set when the shutter-release button is input, wherein the estimating of the PSF from the short-exposure image and the long-exposure image comprises:

estimating a global motion between the short-exposure image and the long-exposure image, and compensating for the global motion;

calculating a first resultant image by applying a band pass filter to the short-exposure image;

calculating a second resultant image by applying the band pass filter to the long-exposure image;

converting the first resultant image and the second resultant image into n-level images, where n is an odd natural number greater than or equal to 3, by deducing a first n-level resultant image and a second n-level resultant image from the first resultant image and the second resultant image, respectively;

correlating the first n-level resultant image and the second n-level resultant image, and calculating a correlation map; and deducing the PSF from the correlation map.

23. A digital photographing apparatus comprising: an imaging unit; an imaging unit controller that continuously captures a short-exposure image and a long-exposure image having different exposure times in response to one shutter-release button input; and an apparatus for estimating a point spread function (PSF) that uses the short-exposure image and the long-exposure image to estimate the PSF of a captured image with respect to the shutter-release button input, wherein the short-exposure image has a shorter exposure time than the long-exposure image, wherein a gain value of the imaging unit with respect to the short-exposure image is greater than a gain value of the imaging unit with respect to the long-exposure image, and wherein a sum of the exposure times of the short-exposure image and the long-exposure image is determined depending on an exposure time set when the shutter-release button is input, wherein the apparatus for estimating a PSF comprises:

a global motion compensating unit that estimates a global motion between the short-exposure image and the long-exposure image, and that compensates for the global motion;

a first resultant image calculating unit that calculates a first resultant image by applying a band pass filter to the short-exposure image;

a second resultant image calculating unit that calculates a second resultant image by applying the band pass filter to the long-exposure image;

an n-level image deducing unit that converts the first resultant image and the second resultant image into n-level images, where n is an odd natural number greater than or equal to 3, and that deduces a first n-level resultant image and a second n-level resultant image from the first resultant image and the second resultant image, respectively;

a correlation map calculating unit that correlates the first n-level resultant image and the second n-level resultant image, and that calculates a correlation map; and a PSF deducing unit that deduces the PSF from the correlation map.

* * * * *